United States Patent
Kaczmarska-Wojtania et al.

(10) Patent No.: US 9,614,656 B2
(45) Date of Patent: *Apr. 4, 2017

(54) PROVIDING IN-LINE SERVICES THROUGH RADIO ACCESS NETWORK RESOURCES UNDER CONTROL OF A MOBILE PACKET CORE IN A NETWORK ENVIRONMENT

(71) Applicants: CISCO TECHNOLOGY, INC., San Jose, CA (US); VODAFONE IP LICENSING LIMITED, Newbury (GB)

(72) Inventors: Malgorzata Kaczmarska-Wojtania, Plano, TX (US); Martin Schubert, Schutterwald (DE); Hendrikus G. P. Bosch, Aalsmeer (NL); Humberto J. La Roche, Ocean, NJ (US); Adam O. MacHale, Lamorlaye (FR); Walter Gottfried Bindrim, Newbury (GB); John L. Moughton, Newbury (GB)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/082,218

(22) Filed: Mar. 28, 2016

(65) Prior Publication Data
US 2016/0277168 A1  Sep. 22, 2016

Related U.S. Application Data

(63) Continuation of application No. 14/086,781, filed on Nov. 21, 2013, now Pat. No. 9,300,453.

(51) Int. Cl.
*H04L 5/00* (2006.01)
*H04W 4/00* (2009.01)
(Continued)

(52) U.S. Cl.
CPC ............. *H04L 5/0053* (2013.01); *H04W 8/18* (2013.01); *H04W 8/20* (2013.01); *H04W 76/021* (2013.01)

(58) Field of Classification Search
None
See application file for complete search history.

(56) References Cited

U.S. PATENT DOCUMENTS

| | | | |
|---|---|---|---|
| 7,953,820 B2 | 5/2011 | Stevens | |
| 8,693,233 B2 | 4/2014 | Scheuerlein et al. | |

(Continued)

FOREIGN PATENT DOCUMENTS

EP  2876914  5/2015

OTHER PUBLICATIONS

U.S. Appl. No. 14/989,133, filed Jan. 6, 2016, entitled "Localizing a Mobile Data Path in a Radio Access Network Under Control of a Mobile Packet Core in a Network Environment," Inventors: Malgorzata Kaczmarska-Wojtania, et al.

(Continued)

*Primary Examiner* — Chi H Pham
*Assistant Examiner* — Soon-Dong D Hyun
(74) *Attorney, Agent, or Firm* — Patent Capital Group

(57) ABSTRACT

A method is provided in one example embodiment and includes sending, by a first entity associated with an access network, a first request message including a session identifier associated with a user session to a second entity associated with a core network. The method further includes establishing a first control channel with the second entity in which the first control channel is associated with the session identifier. The first control channel is an in-band channel between the first entity and the second entity. The method further includes receiving policy information associated with the user session from the second entity using the first (Continued)

control channel. The policy information is indicative of one or more policies to be applied in the access network to user data associated with the user session.

21 Claims, 6 Drawing Sheets

(51) Int. Cl.
*H04W 8/18* (2009.01)
*H04W 76/02* (2009.01)
*H04W 8/20* (2009.01)

(56) References Cited

U.S. PATENT DOCUMENTS

| | | | |
|---|---|---|---|
| 9,253,810 | B2 | 2/2016 | Kaczmarska-Wojtania et al. |
| 9,300,453 | B2 | 3/2016 | Kaczmarska-Wojtania et al. |
| 9,392,025 | B2 | 7/2016 | Bosch et al. |
| 2002/0187777 | A1 | 12/2002 | Osterhout |
| 2003/0076815 | A1 | 4/2003 | Miller et al. |
| 2004/0133683 | A1 | 7/2004 | Keller et al. |
| 2007/0162599 | A1 | 7/2007 | Nguyen |
| 2008/0305784 | A1 | 12/2008 | Dillinger et al. |
| 2009/0116477 | A1 | 5/2009 | Belling et al. |
| 2010/0098096 | A1 | 4/2010 | Yang |
| 2010/0106845 | A1 | 4/2010 | Hu et al. |
| 2010/0153561 | A1 | 6/2010 | Capone et al. |
| 2011/0028120 | A1 | 2/2011 | Wu |
| 2011/0035437 | A1 | 2/2011 | Toumura |
| 2011/0051683 | A1 | 3/2011 | Ramankutty et al. |
| 2011/0070906 | A1 | 3/2011 | Chami et al. |
| 2011/0182291 | A1 | 7/2011 | Li |
| 2011/0310731 | A1 | 12/2011 | Park et al. |
| 2012/0082093 | A1 | 4/2012 | Andreasen et al. |
| 2012/0082094 | A1 | 4/2012 | Andreasen et al. |
| 2012/0082132 | A1 | 4/2012 | Andreasen et al. |
| 2012/0084388 | A1 | 4/2012 | De Foy et al. |
| 2012/0102174 | A1 | 4/2012 | Zhou et al. |
| 2012/0173661 | A1 | 7/2012 | Mahaffey et al. |
| 2012/0209942 | A1 | 8/2012 | Zehavi et al. |
| 2013/0007286 | A1 | 1/2013 | Mehta et al. |
| 2013/0016677 | A1 | 1/2013 | Kunz et al. |
| 2013/0018978 | A1 | 1/2013 | Crowe et al. |
| 2013/0097309 | A1 | 4/2013 | Ma et al. |
| 2013/0173756 | A1 | 7/2013 | Luna et al. |
| 2014/0051437 | A1 | 2/2014 | Diachina et al. |
| 2014/0064177 | A1 | 3/2014 | Anchan |
| 2014/0064249 | A1 | 3/2014 | Lee et al. |
| 2014/0233384 | A1 | 8/2014 | Howard |
| 2014/0241158 | A1 | 8/2014 | Anthony et al. |
| 2014/0378105 | A1 | 12/2014 | Suryavanshi |
| 2015/0139041 | A1 | 5/2015 | Bosch et al. |
| 2015/0139075 | A1 | 5/2015 | Bosch et al. |

OTHER PUBLICATIONS

USPTO Oct. 5, 2016 Non-Final Office Action from U.S. Appl. No. 14/086,734.
USPTO Oct. 28, 2016 Notice of Allowance from U.S. Appl. No. 14/989,133.
USPTO Jun. 29, 2015 Non-Final Office Action from U.S. Appl. No. 14/086,734.
USPTO Jan. 13, 2016 Non-Final Office Action from U.S. Appl. No. 14/086,734.
"AAA protocol," Wikipedia, the free encyclopedia, Feb. 13, 2014, 4 pages http://en.wikipedia.org/w/index.php?title=AAA_protocol&oldid=595247372.
"GPRS core network," Wikipedia, the free encyclopedia, Mar. 15, 2014, 10 pages, http://en.wikipedia.org/w/index.php?title=GPRS_core_network&oldid=599684316.
"GPRS Tunnelling Protocol," Wikipedia, the free encyclopedia, Feb. 13, 2014, 11 pages, http://en.wikipedia.org/w/index.php?title=GPRS_Tunnelling_Protocol&oldid=595292488.
"Lawful Interception," Wikipedia, the free encyclopedia, Dec. 24, 2013, 11 pages http://en.wikipedia.org/w/index.php?title=Lawful_interception&oldid=587527305.
"Proxy Server," Wikipedia, the free encyclopedia, Mar. 17, 2014, 21 pages http://en.wikipedia.org/w/index.php?title=Proxy_server&oldid=600031885.
GPP-TS-29.281-V9.2.0 (Mar. 2010), 3rd Generation Partnership Project; Technical Specification Group Core Network and Terminals; General Packet Radio System (GPRS) Tunnelling Protocol User Plane (GTPv1-U) (Release 9), 3GPP Organizational Partners, Mar. 2010, 24 pages.
EPO Jun. 3, 2015 Extended Search Report and Written Opinion from European Application Serial No. 14194359.

PROVIDING IN-LINE SERVICES THROUGH RADIO ACCESS NETWORK RESOURCES UNDER CONTROL OF A MOBILE PACKET CORE IN A NETWORK ENVIRONMENT

CROSS-REFERENCE TO RELATED APPLICATION

This Application is a continuation (and claims the benefit of priority under 35 U.S.C. §120) of U.S. application Ser. No. 14/086,781, filed Nov. 21, 2013, entitled "PROVIDING IN-LINE SERVICES THROUGH RADIO ACCESS NETWORK RESOURCES UNDER CONTROL OF A MOBILE PACKET CORE IN A NETWORK ENVIRONMENT," Inventors Malgorzata Kaczmarska-Wojtania, et al. The disclosure of the prior application is considered part of (and is incorporated in its entirety by reference in) the disclosure of this application.

TECHNICAL FIELD

This disclosure relates in general to the field of communications and, more particularly, to providing in-line services through a radio access network under control of a mobile packet core in a network environment.

BACKGROUND

Today, a mobile user's data session is anchored on a mobile gateway such as a (GGSN, PGW) working as part of a mobile packet core. Anchoring the mobile data session on the mobile gateway includes anchoring both control and data traffic flows between the user's device and the mobile gateway. Control traffic is exchanged between the user's device and the gateway, and then terminated on the gateway. In an uplink direction, the data traffic is decapsulated from a mobile encapsulation protocol and presented on a Gi interface as Internet Protocol (IP) packets. The data traffic is then often sent either to a service provider private network to deliver services or service provider private content, or is sent to the Internet for content delivery. The mobile gateway terminates tunnel encapsulation specific to the mobile network and presents IP traffic on its Internet facing interface. The mobile gateway is also responsible to applying various services to the data stream based on a user profile. Examples of such services include quality of service (QoS), deep packet inspection, traffic management, lawful intercept, http header enrichment as well as billing the data stream sent to and/or from the user. These services are applied in the mobile packet core, and mobile operators typically have a complete infrastructure to provide these services to the mobile user based on their profile. All of the data traffic between the user equipment and its termination point in both the uplink and downlink directions passes via the mobile gateway.

In selected scenarios it is desirable to terminate the mobile data path locally in the radio access network (RAN) or the transport. This is called the local termination point. A goal of the local data path termination is the need to serve local content or to apply localized services which can, in turn, lead to greater network efficiency and likely better user experience. However the local termination needs to be very selective and it should be based on the user profile and other criteria only known to the core network. The set of criteria whether to terminate the data plane locally will depend on the user's subscription services, their service plan, billing status and other factors that are only known in the packet core. Therefore the decision to locally terminate the data path cannot be made at the potential local termination point because the local termination point is unable to make unilateral decision linked to the user's profile.

Furthermore, for the locally serviced traffic it is essential that the mobile packet core functions such as billing are still applied to the locally terminated traffic. Typical 3GPP network mechanism do not allow for this selective data path handling while still supporting mobile packet core services. The localized data path handling is required in the environments where there are suitable resources in the RAN to allow to localized content and service delivery. It remains a challenge to implement a solution to the problem in a practical and efficient manner so that the existing mobile packet core deployments are not disrupted.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

Figure 1:
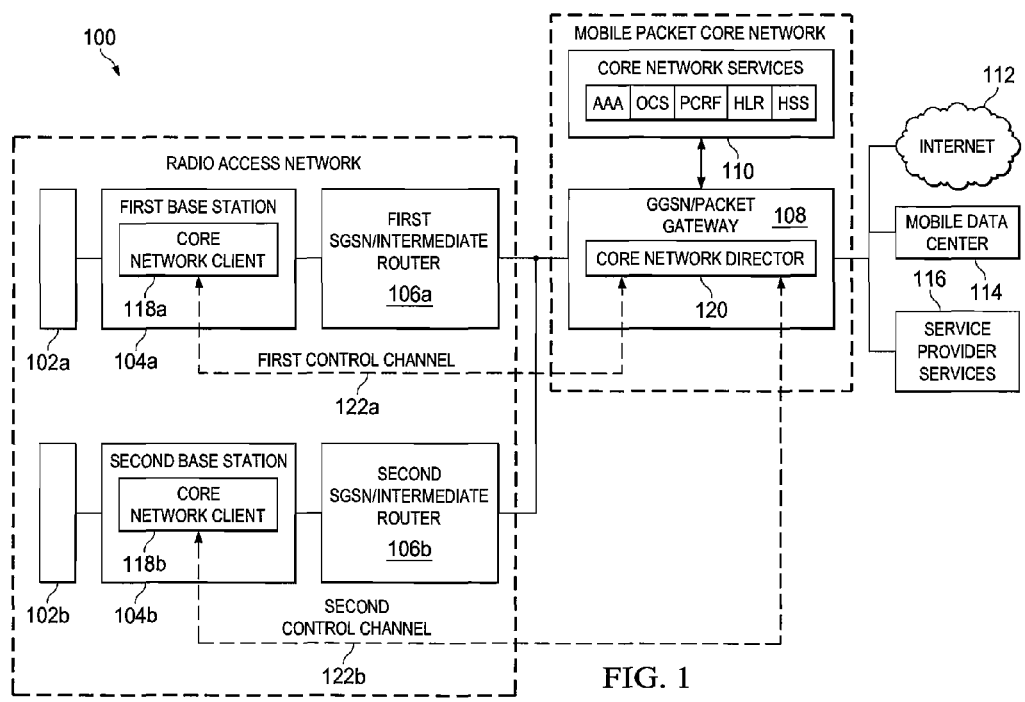
FIG. 1 is a simplified block diagram of an example embodiment of a communication system for localizing a mobile data path in a radio access network under control of a mobile packet core in a network environment.

A method is provided in one example embodiment and includes sending, by a first entity associated with an access network, a first request message including a session identifier associated with a user session to a second entity associated with a core network. The method further includes establishing a first control channel with the second entity in which the first control channel is associated with the session identifier. The first control channel is an in-band channel between the first entity and the second entity. The method further includes receiving policy information associated with the user session from the second entity using the first control channel. The policy information is indicative of one or more policies to be applied in the access network to user data associated with the user session.

In a particular embodiment, the method further includes implementing the one or more policies indicated by the policy information for user data associated with the user session. In another particular embodiment, implementing the one or more policies includes executing an application within the access network to process the user data in accordance with the one or more policies.

In still another particular embodiment, the first control channel uses a tunneling protocol between the first entity and the second entity. In a particular embodiment, the tunneling protocol is a GPRS Tunneling Protocol user data (GTP-U) protocol. In still another embodiment, the policy information is included within a tunneling protocol packet. In still another embodiment, the policy information is included within a data portion of the tunneling protocol packet. In another particular embodiment, the tunneling protocol packet is a GPRS Tunneling Protocol user data (GTP-U) packet.

In other particular embodiments, the first entity is a client entity and the second entity is a director entity. In still another particular embodiment, the user session is associated with a user equipment. In still another particular embodiment, the first entity resides within a base station. In still another particular embodiment, the second entity resides within a packet gateway.

A method is provided in another example embodiment and includes receiving, by a first entity associated with a core network, a first request message including a session identifier associated with a user session from a second entity associated with an access network. The method further includes establishing a first control channel with the second entity in which the first control channel associated with the session identifier. The first control channel is an in-band channel between the first entity and the second entity. The method still further includes generating policy information associated with the user session. The policy information is indicative of one or more policies to be applied in the access network to user data associated with the user session. The method further includes sending the policy information to the second entity using the first control channel.

In a particular embodiment, the method further includes storing the policy information as a first state of the second entity.

In still another particular embodiment, the method further includes receiving a second request message including the session identifier from a third entity associated with the access network, and establishing a second control channel with the third entity. The second control channel is associated with the session identifier. The method further includes sending the policy information of the first state to the third entity, wherein the third entity is configured to implement the one or more policies for the user session using the policy information of the first state. In a particular embodiment, the second control channel is an out-of-band channel.

In a particular embodiment, implementing the one or more policies includes executing an application within the access network to process the user data in accordance with the one or more policies.

In still another particular embodiment, the first control channel uses a tunneling protocol between the first entity and the second entity. In a particular embodiment, the tunneling protocol is a GPRS Tunneling Protocol user data (GTP-U) protocol. In still another embodiment, the policy information is included within a tunneling protocol packet. In still another embodiment, the policy information is included within a data portion of the tunneling protocol packet. In another particular embodiment, the tunneling protocol packet is a GPRS Tunneling Protocol user data (GTP-U) packet.

In other particular embodiments, the first entity is a client entity and the second entity is a director entity. In still another particular embodiment, the user session is associated with a user equipment. In still another particular embodiment, the first entity resides within a base station. In still another particular embodiment, the second entity resides within a packet gateway.

EXAMPLE EMBODIMENTS

Figure 2:
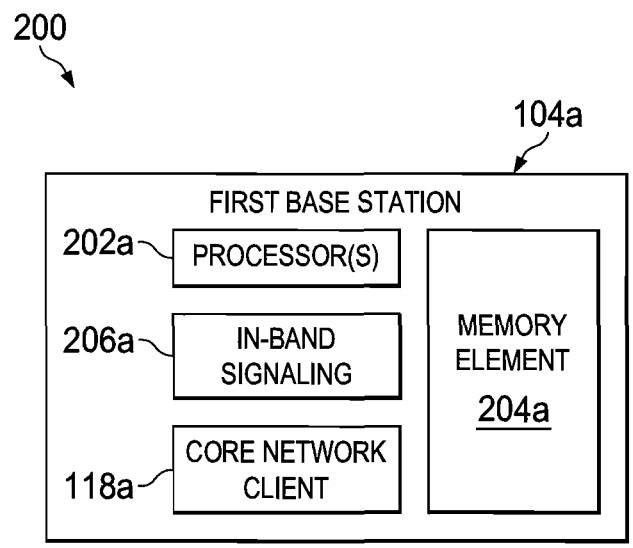
FIG. 2 is a simplified block diagram illustrating a particular embodiment of the first base station of the communication system of FIG. 1.
Figure 3:
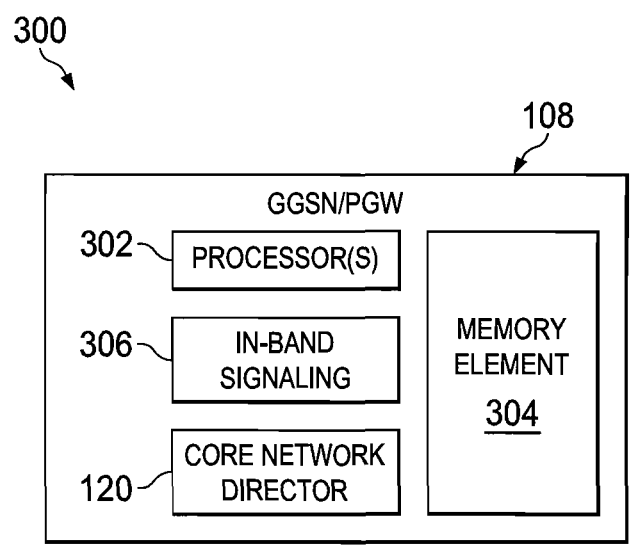
FIG. 3 is a simplified block diagram illustrating a particular embodiment of the Gateway GPRS support node/packet gateway (GGSN/PGW) of the communication system of FIG. 1.

FIGS. 1-3 of the present disclosure include subject matter expressly described and claimed (in whole or in part) in U.S. application Ser. No. 14/086,754 entitled "LOCALIZING A MOBILE DATA PATH IN A RADIO ACCESS NETWORK UNDER CONTROL OF A MOBILE PACKET CORE IN A NETWORK ENVIRONMENT" to Margaret Kaczmarska-Wojtania, Andrew S. Gibbs, Martin Shubert, and Gibson Soon Teck Ang, assigned to Cisco Technology, Inc. and filed on Nov. 21, 2013. The subject matter described in application Ser. No. 14/086,754 is not by itself within the scope of the claimed subject matter of the present disclosure.

Turning to FIG. 1, FIG. 1 is a simplified block diagram of an example embodiment of a communication system 100 for localizing a mobile data path in a radio access network under control of a mobile packet core in a network environment. The particular embodiment illustrated in FIG. 1 is shown as including general packet radio service (GPRS) network elements. However, it should be understood that in other embodiments any other suitable network elements may be used. The communication system of FIG. 1 includes first user equipment (UE) 102*a* and second user equipment 102*b*. First user equipment 102*a* may connect wirelessly to a first base station 104*a* and second user equipment 102*b* may connect wirelessly to a second base station 104*b*. In one or more embodiments, first base station 104*a* and second base station 104*b* are mobile base stations of a radio access network (RAN). In a particular embodiment, first base station 104*a* and second base station 104*b* are each an Evolved Node B (eNodeB) Long Term Evolution (LTE) base station node. In still other embodiments, first base station 104*a* and second base station 104*b* are each a Universal Mobile Telecommunications System (UMTS) base station node. First base station 104*a* may be further connected to a first Serving GPRS support node (SGSN) and/or intermediate router 106*a*, and second base station 10*b* may be further connected to a second SGSN/intermediate router 106*b*. An SGSN, such as first SGSN/intermediate router 106*a* and second SGSN/intermediate router 106*b* may be responsible for the delivery of data packets from and to user equipment within its geographical service area. Its tasks may include packet routing and transfer, mobility management, logical link management, and authentication and charging functions.

Each of first SGSN/intermediate router 106*a* and second SGSN/intermediate router 106*b* may be further connected to a Gateway GPRS support node (GGSN)/packet gateway (PGW) 108 within a mobile core network. GGSN/PGW 108 may be further connected to one or more core network services 110 within the mobile core network. Core network services 110 may include authentication, authorization, and accounting (AAA) services, billing services, policy services, and other core network services. In the particular embodiment illustrated in FIG. 1, the core network services may include AAA services, an online charging system (OCS), a policy and charging rules function (PCRF), a home location register (HLR), and a home subscriber server. GGSN/PGW 108 may be further connected to the Internet 112, a mobile data center 114, and service provider services 116. In a particular embodiment, GGSN/PGW 108 is responsible for the internetworking between the GPRS network and external packet switched networks such as the Internet and X.25 networks. In particular embodiments, GGSN/PGW 108 is an anchor point that enables mobility of user equipment 102a-102b in GPRS/UMTS networks and maintains routing information necessary to tunnel protocol data units (PDUs) to the SGSN that services the particular user equipment 102a-102b, e.g. one or more mobile stations. GGSN/PGW 108 may encapsulate GPRS packets received from first SGSN/intermediate router 106a into an appropriate packet data protocol (PDP) format (e.g., IP or X.25) and send packets out on the corresponding packet data network. GGSN/PGW 108 may further store a current SGSN address associated with a user and his or her profile in a location register of GGSN/PGW 108. GGSN/PGW 108 may further be responsible for IP address assignment and is the default router for connected user equipment (UE) 102a-102b. GGSN/PGW 108 may further perform authentication, billing/charging functions and other functions via core network services 110. Communication system 100 may further include an IP backhaul from the RAN to GGSN/PGW 108.

First base station 104a includes a first core network client component 118a, and second base station 104b includes a second core network client component 118b. GGSN/PGW 108 includes a core network director component 120. In accordance with various embodiments, each of first core network client component 118a, second core network client component 118b, and core network director component 120 may include one or more software components, one or more hardware components, or a combination of software and hardware components. First core network client component 118a is in communication with core network director component 120 using a first control channel 122a established between first core network client component 118a and core network director component 120. Similarly, second core network client component 118b is in communication with core network director component 120 using a second control channel 122b established between second core network client component 118b and core network director component 120.

In one or more embodiments, first control channel 122a and second control channel 122b are each an in-band channel established between the respective core network clients 118a-118b and core network director component 120. In one or more embodiments, core network clients 118a-118b and core network director component 120 communicate with one another using a GPRS Tunneling Protocol (GTP). GTP is a group of IP-based communications protocols used to carry general packet radio service (GPRS) within GSM, UMTS, LTE and other networks. GTP may be decomposed into separate protocols, GTP-C, GTP-U and GTP'. GTP-C is used within the GPRS core network for signaling between gateway GPRS support nodes (GGSN) and serving GPRS support nodes (SGSN). This allows the SGSN to activate a session on a user's behalf (PDP context activation), to deactivate the same session, to adjust quality of service parameters, or to update a session for a subscriber who has just arrived from another SGSN. GTP-U is used for carrying user data within the GPRS core network and between the radio access network and the core network. The user data transported can be packets in any of IPv4, IPv6, or PPP formats. GTP' (GTP prime) uses the same message structure as GTP-C and GTP-U, but has an independent function. It can be used for carrying charging data from the charging data function (CDF) of the GSM or UMTS network to the charging gateway function (CGF).

Different GTP variants may be implemented by RNCs, SGSNs, GGSNs and CGFs within 3GPP networks. GPRS mobile stations may be connected to a SGSN without being aware of GTP. GTP may be used with user datagram protocol (UDP) or transmission control protocol (TCP) formatted packets.

In a particular embodiment, first control channel 122a and second control channel 122b are GTP-U tunnels established between core network client components 118a-118b and core network director component 120. In one or more embodiments, control information is exchanged between core network client components 118a-118b and core network director component 120 using GTP user data (GTP-U) formatted packets. In still other embodiments, first control channel 122a and second control channel 122b are out-of-band channels. In accordance with various embodiments, core network director 120 is configured to send policy information regarding a subscriber to first core network client component 118a and second core network client component 118b over the first control channel 122a and the second control channel, respectively. First core network client component 118a and second core network client component 118b may then implement the one or more policies conveyed by the policy information within the RAN upon data associated with a subscriber as will be further described herein.

Each of the elements of FIG. 1 may couple to one another through simple interfaces (as illustrated), or through any other suitable connection (wired or wireless), which can provide a viable pathway for network communications. Additionally, any one or more of these elements may be combined or removed from the architecture based on particular configuration needs. Communication system 100 may facilitate transmission control protocol/Internet protocol (TCP/IP) communications for the transmission or reception of packets in a network, and may operate in conjunction with a user datagram protocol/IP (UDP/IP), or any other suitable protocol where appropriate and based on particular needs.

Communication system 100 may be tied to the 3rd Generation Partnership Project (3GPP) Evolved Packet System architecture, but alternatively this depicted architecture may be equally applicable to other environments such as a 4G LTE network. In general terms, 3GPP defines the Evolved Packet System (EPS) as specified in TS 23.401, TS.23.402, TS 23.203, etc. The EPS consists of IP access networks and an Evolved Packet Core (EPC). Access networks may be 3GPP access networks, such a GERAN, UTRAN, and E-UTRAN, or they may be non-3GPP IP access networks such as digital subscriber line (DSL), Cable, WiMAX, code division multiple access (CDMA) 2000, WiFi, or the Internet. Non-3GPP IP access networks can be divided into trusted and untrusted segments. Trusted IP access networks support mobility, policy, and AAA interfaces to the EPC, whereas untrusted networks do not. Instead, access from untrusted networks can be performed via the evolved PDG (ePDG), which provides for IPsec security associations to the user equipment over the untrusted IP access network. The ePDG (in turn) supports mobility, policy, and AAA interfaces to the EPC, similar to the trusted IP access networks.

Note that first user equipment 102a and second user equipment 102b can be associated with clients, customers, or end users wishing to initiate a communication in system 100 via some network. In one particular example, first user equipment 102a and second user equipment 102b reflects devices configured to generate wireless network traffic. The term 'endpoint' and 'end-station' are included within the broad term user equipment, as used herein. First user equipment 102a and second user equipment 102b can include devices used to initiate a communication, such as a computer, a personal digital assistant (PDA), a laptop or electronic notebook, a cellular telephone, an iPhone, a Blackberry, an Android, a smartphone, a tablet, an iPad, an IP phone, or any other device, component, element, equipment, or object capable of initiating voice, audio, video, media, or data exchanges within communication system 100. First user equipment 102a and second user equipment 102b may also include a suitable interface to the human user, such as a microphone, a display, or a keyboard or other terminal equipment. First user equipment 102a and second user equipment 102b may also be any device that seeks to initiate a communication on behalf of another entity or element, such as a program, a database, or any other component, device, element, or object capable of initiating an exchange within communication system 100. Data, as used herein in this document, refers to any type of numeric, voice, video, media, or script data, or any type of source or object code, or any other suitable information in any appropriate format that may be communicated from one point to another.

For purposes of illustrating certain example techniques of communication system 100, it is important to understand the communications that may be traversing the network. The following foundational information may be viewed as a basis from which the present disclosure may be properly explained. IP networks may provide users with connectivity to networked resources such as corporate servers, extranet partners, multimedia content, the Internet, and any other application envisioned within IP networks. While these networks generally function to carry data plane (user-generated) packets, they may also implicate control plane and management plane packets.

The term packet is used to refer to data plane packets, control plane packets, and management plane packets. In general, the data plane (also known as the forwarding plane, or the user plane) provides the ability to forward data packets; the control plane provides the ability to route data correctly; and the management plane provides the ability to manage network elements. For normal IP packet processing, an IP router typically has a data plane, a control plane, and a management plane. The IP packets themselves support all of the planes for any IP-based protocol, and the IP router has no inherent knowledge about whether each IP packet is a data, control, or management plane packet.

The vast majority of packets handled by a router travel through the router via the data plane. Data plane packets typically consist of end-station, user-generated packets, which are forwarded by network devices to other end-station devices. Data plane packets may have a transit destination IP address, and they can be handled by normal, destination IP address-based forwarding processes. Service plane packets can be a special type of data plane packets. Service plane packets are also user-generated packets, which may be forwarded by network elements to other end-station devices; however, they may require high-touch handling by a network element (above and beyond normal, destination IP address-based forwarding) to properly forward the packet.

Control plane packets commonly include packets that are generated by a network element (e.g., a router or a switch), as well as packets received by the network that may be used for the creation and operation of the network itself. Control plane packets may have a receive destination IP address. Protocols that "glue" a network together, such as address resolution protocol (ARP), border gateway protocol (BGP), and open shortest path first (OSPF), often use control plane packets. In a mobile network, the control plane may be responsible for session management, call setup support requirements, interfacing with external servers (e.g., querying for per-user policy and control information), managing high availability for a gateway, and configuring and managing the data plane. Packet overloads on an IP router's control plane can inhibit the routing processes and, as a result, degrade network service levels and user productivity, as well as deny specific users or groups of users' service entirely.

Management plane packets also typically include packets that are generated or received by a network element. This may also include packets generated or received by a management station that are used to manage a network. Management plane packets may also have a receive destination IP address. Examples of protocols that manage a device and/or a network, which may use management plane packets, include Telnet, Secure Shell (SSH), Trivial File Transfer Protocol (TFTP), Simple Network Management Protocol (SNMP), file transfer protocol (FTP), and Network Time Protocol (NTP).

In existing systems, data packets arrive at the mobile gateway to get served and billed according to 3GPP specification. Some 3GPP solutions such as Selected IP Traffic Offload (SIPTO) allows for local traffic offload, but mobile packet core services such as billing are not available for the locally offloaded traffic. Other solution such as Local IP Access (LIPA) require distributing the gateway function which will disrupt the existing gateway and mobile packet core infrastructure and is thus not practical for operators.

In a 3GPP system, subscriber information is kept by the packet gateway and addressed by way of a mobile node's IP address at the (S)Gi side and GTP tunnel identifier at the 3GPP network side. For instance, in LTE, the P-GW hosts both a mobility anchor point and a service plane for mobile nodes. Similarly, in UMTS, the GGSN provides similar functionality. This subscriber information keeps and maintains charging and policy information, provides a point at which regulatory functions can execute (e.g. lawful intercept) and may provide additional subscriber-specific functions such as Policy Control and Charging (PCC), firewalls, video and HTTP proxies and network address and port translation (NAPT) functions.

Further, 3GPP manages itself by way of bearers or PDP-Contexts. A bearer is an end-to-end connection between a mobile node, (logical) radio channels, and per-bearer GTP tunnels between the RAN and the packet gateway. Moreover, in 3GPP, potentially a mobile node can maintain multiple bearers each pointing to different packet gateways.

When a packet arrives in the packet gateway from the Internet or another autonomous system destined to the mobile node, the packet gateway first selects the appropriate subscriber state. Based on this state, the packets are routed through the services associated with the mobile node before being routed over GTP tunnels to downstream 3GPP nodes by way of its GTP bearer. The appropriate GTP tunnel identifiers and GTP next hops are recorded in the subscriber's GTP bearer state. As seen from the packet gateways, downstream 3GPP nodes can be the LTE S-GW, UMTS SGSN or even the 3GPP RAN nodes (RNC in regular UMTS or NodeB base station for I-HSPA) in a case in which direct-tunnel is used. These intermediate nodes map incoming bearers on outgoing bearers by replacing both the GTP next hop and potentially the GTP tunnel identifier.

Packets originating from the mobile node are routed from the 3GPP RAN potentially through intermediate nodes to the packet gateway. Again, a GTP tunnel identifier and the GTP next hop routing are first used to route packets over the GTP bearer to intermediate 3GPP nodes before these parameters are used to select the appropriate subscriber state in the packet gateway. Note that depending on the configuration of the network, the roaming state of the mobile node and the state of the mobile node itself, there can be a direct tunnel between the packet gateway and RAN, or there can be two cascaded tunnels between the two elements.

Today user services are typically implemented in the packet core (LTE and UMTS) which is centralized and all user traffic is tunneled to that central location for services to be applied. Various embodiments provide an architecture that enables the deployment of services in-line with data flow inside a RAN such as, for example, at a base station, Enhanced NodeB, UMTS Radio Network Controller (RNC), or other suitable network element. In accordance with various embodiments, the architecture described herein allows selected services to be implemented in the base station or other RAN network element to improve user experience, make better use of locally relevant information and improve network efficiency. Examples of improved user experience that may be provided include locally hosted gaming applications with reduced latency and significantly improved response times, caching or optimization applications which reduce backhaul loading and help postpone capital investments.

Various embodiments provide for locally terminating a data path under the control of the mobile packet core by the use of a logical control channel between the control plane point of attachment at an entity in the mobile gateway and the point in the RAN in which the control and data traffic enter the mobile network. In accordance with one or more embodiments, the control channel has two endpoints: a first endpoint in the core network collocated with a session's point of attachment and the second one in the RAN also collocated with the RAN point of entry into the mobile network. The control channel carries policy information associated with one or more subscriber policies sent in the downlink direction from the core network. In particular embodiments, the core network is the originator of these policies which convey instructions regarding services and local data path handling. The RAN endpoint receives the policy information and enforces the policies accordingly to their content. In the uplink direction, the RAN endpoint sends reports to the core network to convey relevant information about the user session and bearers such as consumed volume. In various embodiments, the control channel, policies and reports are key to enabling localized data path handling in a selective fashion while still providing mobile packet core services such as billing and other services.

In a particular embodiment, a PDP/PDN Session is established and always anchored in the mobile packet core on GGSN/PGW 108, control traffic (Gx, Gy, Ga, Ll) continues to be anchored on GGSN/PGW 108 as per 3GPP specifications, and the data plane can either remain centralized in the mobile packet core network for traffic requiring full service control or distributed to first core network client component 118a and/or second core network client component 118b in the RAN as per policies received from core network director component 120 for specific use cases. The control plane may be controlled from the mobile packet core network by core network director component 120 based on user services, traffic type, and other data. Core network director component 120 may further interacts with GGSN/PGW 108 to obtain user information.

In various embodiments a logical control channel, such as first control channel 122a and/or second control channel 112b, is established either in-band or out-of-band between the core network client in the RAN and the core network director in the mobile packet core. In a particular embodiment, both endpoints of the channel may be uniquely identified in the mobile core network topology. In particular embodiments, this unique identification may rely on an IP addresses or other identifier used in the mobile network. In various embodiments, the identification is applied to the endpoints themselves and is decoupled from the information carried within the channel and how it identifies an individual session. In one or more embodiments, the control channel is bidirectional such that the policy information may be sent from the core network director in the mobile packet core network to one or more core network clients in the RAN in the downlink direction. A core network client in the RAN may further send information related to the user session to the core network director in the mobile core network in the uplink direction. The information carried by the control channel may uniquely identify which end user session it is applicable to and the control channel may use an appropriate protocol to convey the bidirectional exchange of information effectively.

In one or more embodiments, a core network director in the mobile packet core network sends data path policy information associated with policies originating in the mobile packet core to a core network client in the RAN endpoint via the control channel. The data path policy information may identify a specific user session for which they are applicable. In one or more embodiments, the mobile core network endpoint is responsible for creating one or more data path policies based on a variety of inputs such as based on a particular user, a service profile, session information, dynamic bearers, applications used at any given point, dynamic network state and other factors. These data path policies may be constructed based on one or more of the conditions mentioned above which are provided only as examples and are not intended to be limiting. In other embodiments, other factors may be used to construct one or more data path policies.

The data path policies may include actions to be enforced by the RAN endpoint in which there is a common understanding and interpretation of these actions by the core network endpoint and RAN endpoint of the control channel. Examples of action that may be enforced by the RAN include local data path handling or reverting to standard 3GPP data path handing in the mobile packet core, local content delivery, local traffic optimization or local service application. Other types of actions may also be defined to handle local data path in the RAN. The data path policies are sent from the core network to the RAN endpoint and are intended to influence how the data path is handled for a particular condition. The data path policies may convey policies about localized data path handling or an enforcement action in which the localized data path handling is now handed over the core data path handling. It should be understood that the data path policies can be sent at any point during a user session and are not necessarily required to be set during the beginning of the user session.

In accordance with various embodiments, a core network client in the RAN endpoint will interpret and enforce the data path polices it receives from the core network director in the mobile packet core network. The enforcement action may occur at the beginning of a session or while the session is in progress. In particular embodiments, data path policy enforcement may include localizing the data path and applying a selected set of services. In other embodiments, data path policy enforcement may include moving the handling of the data path to the mobile packet core network.

Hence, the architecture of FIG. 1 can effectively provide a mechanism in which a mobile packet core network entity, such as core network director component 120 of GGSN/PGW 108, can direct an entity in the RAN, such first core network client 118a, to handle a data path associated with a subscriber locally in the RAN/transport under a selected set of conditions defined by one or more policies via establishment of a control channel between the mobile packet core network entity and the RAN entity.

FIG. 2 is a simplified block diagram 200 illustrating a particular embodiment of first base station 104a of communication system 100 of FIG. 1. First base station 104a includes one or more processor(s) 202a, a memory element 204a, an in-band signaling component 206a, and core network client 118a. Processor(s) 202a are configured to execute software instructions to perform various operations of base station 104a as described herein. Memory element 204a may be configured to store software instructions and data associated with base station 104a. In-band signaling component 206a is configured to establish an in-band control channel, such as first control channel 122a, with core network director component 120 of GGSN/PGW 108. In a particular embodiment, the in-band control channel is a GTP-U channel. Core network client component 118a is configured to implement the various core network client operations as described herein. In one or more embodiments, second base station 104b may be implemented in a similar manner as first base station 104a.

Although the particular embodiment illustrated in FIG. 2 shows base station 104a as including a single node, it should be understood that in other embodiments base station 104a may include any number of nodes. In still other embodiments, a cluster may be formed of any number of processing nodes distributed throughout a number of servers or other network elements within a communication network.

FIG. 3 is a simplified block diagram 300 illustrating a particular embodiment of GGSN/PGW 108 of communication system 100 of FIG. 1. GGSN/PGW 108 includes one or more processor(s) 302, a memory element 304, in-band signaling component 306, and core network director component 120. Processor(s) 302 are configured to execute software instructions to perform various operations of GGSN/PGW 108 as described herein. Memory element 304 may be configured to store software instructions and data associated with GGSN/PGW 108. In-band signaling component 306 is configured to establish an in-band control channel, such as first control channel 122a, with core network client 118a of base station 104a. In a particular embodiment, the in-band control channel is a GTP-U channel. Core network director component 118a is configured to implement the various core network director operations as described herein.

Although the particular embodiment illustrated in FIG. 3 shows GGSN/PGW 108 as including a single node, it should be understood that in other embodiments GGSN/PGW 108 may include any number of nodes. In still other embodiments, a cluster may be formed of any number of processing nodes distributed throughout a number of servers or other network elements within a communication network.

Dynamic Establishment and Maintenance of Control Channel

Referring again to FIG. 1, an embodiment of a procedure for dynamically establishing and maintaining a control channel connection between core network client component 118a and core network director 120 is described. Various embodiments of communication system 100 enable the hosting of services in a radio access network, such as a 3GPP Radio Access Network (RAN). In one or more embodiments, the services are hosted in one or more of first base station 104a and second base station 104b such that these services may, for example, be locally relevant, reduce end-to-end delay, and reduce backhaul resources or other resources, while not compromising existing and centralized charging, lawful intercept and other traditional functions hosted in existing mobile packet core networks. In order to achieve this in various embodiments, core network client 118a is hosted in the RAN and core network director 120 is hosted on the packet gateway. In a particular embodiment, core network client 118a may behave as a "bump-in-the-wire" on GTP-U traffic, meaning that all GTP-U traffic originating from and destined to a mobile node, such as first user equipment 102a, is first routed through core network client 118a. In some embodiments, core network client 118a may service data completely locally at the cell site. Accordingly, a procedure is needed to dynamically establish a connection between a core network client, such as one or more of core network clients 118a-118b, and the appropriate core network director 120, specifically the core network director that is co-located with the GTP bearer's termination point for a particular mobile node.

For a particular core network client it may be important to maintain an end-to-end session to the core network director managing the subscriber state for a particular mobile node for enabling the core network client and the core network director to exchange information pertinent to the service being delivered from one or more applications running in the base station or other RAN network element. For instance, if a storing mobile to mobile (M2M) service is to be applied to a user session, the core network client may signal the core network director via the in-band control protocol of the availability of stashed data, and the core network client may make local IP services available. Alternatively, a core network director may signal a particular core network client of the availability of cacheable video fragments or that new services need to be started for a particular GTP bearer.

Given that a 3GPP RAN or other radio access network may have more than one packet gateway, and that a 3GPP RAN may or may not communicate directly with a packet gateway, a protocol is needed that establishes an end-to-end connection between the core network client and the core network director on a per GTP bearer basis. Various embodiments use an in-band GTP-U signaling protocol to establish a logical connection between the core network client and its particular core network director.

The GTP-U messages are either user plane messages or signaling messages. User plane messages are used to carry user data packets between GTP-U entities. Signaling messages are predefined, standardized messages sent between network nodes for path management and tunnel management. In addition, the GTP-U protocol defines an Extension Header mechanism which allows additional signaling information to be carried in the header of an existing GTP-U user plane message. Since these signaling mechanisms provide the transport of a small amount of operator-specific information as well as predefined, standardized information, they may be used to indicate that the packet belongs to a logical connection between the core network client and its core network director rather than carrying user data. GTP-U is an IP based tunneling protocol which permits many tunnels between each set of end points. Each subscriber will have one or more tunnels, one for each bearer that they have active, as well as possibly having additional tunnels for specific connections with different quality of service requirements. The separate tunnels may be identified by a Tunnel Endpoint Identifier (TEID) in the GTP-U messages, which may be a dynamically allocated random number. In the GTPv1-U protocol an IP packet for a particular user equipment is encapsulated in an GTPv1-U packet and tunneled between the GGSN/PGW and the base station (e.g., eNodeB) for transmission to the user equipment.

In particular embodiments, the core network client operates as an additional function in the path of the GTP-U tunnel or "bump-in-the-wire" inside a RAN base station such that all GTP-U traffic originating from and destined to a mobile node is first routed through the core network client. The core network may learn which bearers are managed by the RAN by learning of all the GTP tunnel identifiers and next hops of all active sessions.

Figure 4:
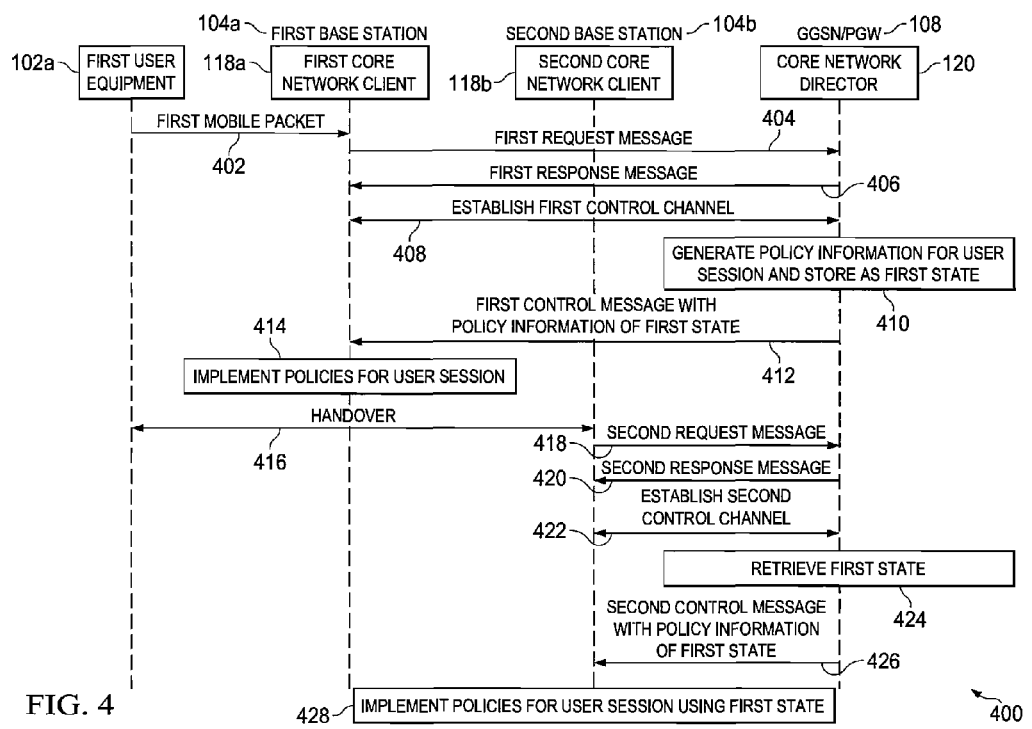
FIG. 4 is a simplified flow diagram illustrating potential operations of the communication system associated with one embodiment of the present disclosure.

Referring now to FIG. 4, FIG. 4 is a simplified flow diagram 400 illustrating potential operations of communication system 100 associated with one embodiment of the present disclosure. In particular, simplified flow diagram 400 illustrates operations for establishment and maintenance of a control channel showing flows and operations associated with first user equipment 102a, first core network client 118a of first base station 104a, second core network client 118b of second base station 104b, and core network director 120 of GGSN/PGW 108. In one or more embodiments, core network client 118a maintains a list or table of all active GTP tunnel identifiers and next hops. If core network client 118a receives a GTP-U packet with an unknown GTP tunnel identifier and next hop, core network client 118a starts a protocol to establish an end-to-end session between core network client 118a and core network director 120 operating within GGSN/packet gateway 108.

In 402, first core network client 118a within first base station 104a receives a first mobile packet from user equipment 102a. In a particular embodiment, the first mobile packet is a GTP-U packet. In one or more embodiments, the first mobile packet is associated with a user session of a subscriber or user of first user equipment 102a. In 404, first core network client 118a determines that a GTP tunnel identifier and next hop is not within its list of active GTP tunnel identifiers and next hops, and generates and sends a first request message including a session identifier associated with the user session and sends the first request message including the session identifier to core network director 120 of GGSN/PGW 108. In a particular embodiment, the first request message is sent to core network director 120 through a GTP-U tunnel between first core network client 118a and core network director 120. In particular embodiments, core network client 118a establishes a connection through the GTP-U tunnel of the unknown or new bearer and transmits an initial core network control message or probe message. In particular embodiments, the connection is established using a TCP or UDP-based protocol with a specific protocol number. The IP packets comprising this connection may be transported in the same manner as user data packets, exploiting the sparse occupancy of the IP address space in the GTP-U tunnel as a means of distinguishing the two kinds of information without using the signaling or extension header mechanisms of GTP-U described above. This initial message may carry additional RAN parameters such as a cell identifier or an IP address or other base station identifier associated with the base station. Although not illustrated in FIG. 4, it should be understood that in one or more embodiments first base station 104a may communicate with GGSN/PGW 108 via first SGSN/intermediate router 106a, and second base station 104b may communication with GGSN/PGW 108 via second SGSN/intermediate router 106b.

In 406, core network director 120 generates a first response message and sends the first response message to first core network client 118a. In one or more embodiments, the first response message includes subscriber information and connection information associated with the user session. In 408, a first control channel is established between first core network client 118a and core network director 120 for the user session. In one embodiment, the first control channel is an in-band channel established between first core network client 118a and core network director 120. In a particular embodiment, the first control channel uses a GTP-U tunneling protocol. In still another embodiment, the first control channel may be an out-of-band channel established between first core network client 118a and core network director 120. At GGSN/PGW 108, the core network control messages are separated from the user data packets and passed to core network director 120. At core network director 120, the initial core network control message is used to create internal state reflective of the core network client/core network director connection for the GTP-U bearer. In particular embodiments, if this initial message is sent after a handover operation of the user equipment from base station to another base station, the core network director may already have established state for the particular GTP-U bearer, and it can record the reception of the initial message as a handover to new core network client 118b. In such instances, core network director 120 may then send the established state to the new base station.

In 410, in response to the initial core network control message from core network client 118a, core network director 120 generates policy information for the user session and stores the policy information as a first state of first core network client 118a for the user session. The policy information is indicative of one or more policies to be applied in the access network to user data associated with the user session. The policies may include one or more applications, services, or processing actions to be applied to user data associated with the user session. In one or more embodiments, core network director 120 stores the policy information for the user session in one or more base station tables which store the policy information for the user session in association with the particular base station. In 412, core network director 120 sends the first control message with the policy information of the first state to first core network client 118a using the first control channel. The first control message may include a core network response message including parameters indicative of services and/or policies that need to be started "on" the bearer, as well as Internet (packet) gateway parameters and capabilities. In one or more embodiments, the first control message response is again embedded into the GTP-U bearer using GTP-U tunnel identifiers and next hops. In 414, in response to receipt of the core network director's response message, core network client 118a records the establishment of the end-to-end client/director session and reacts to the controlling information embedded in the first control message by implementing one or more policies identified and/or indicated by the policy information to the user session such that user data associated with the user session is processed according to the one or more policies. For example, implementing one or more policies may include executing an application within the RAN to process the user data in accordance with the one or more policies.

In particular embodiments, core network client 118a may use any source IP address for packets sent to core network director 120 that is different from the mobile device's IP address or small subnet assigned to the mobile node. GGSN/PGW 108 separates such packets from the user data packets on the basis of source IP address. Similarly, packets sent by core network director 120 with a destination address of the core network client may be injected directly into the GTP-U control channel. In particular embodiments, the IP address associated with the core network client may be same for every core network client for every bearer since the bearer is identified by the GTP-U tunnel identity. Alternatively, each core network client, or even each bearer for each core network client may use a distinct address that is outside of the address pool of the access point name (APN) of GGSN/PGW 108. In addition, each core network client and/or bearer may use an address that is outside of all the address pools of the APN in all of the GGSNs/PGWs, but not in the range of addresses reached through the Access Point (e.g. a non-routable address). In some embodiments, core network director 120 may also be assigned a similar address, allowing simple routing to be used in GGSN/PGW 108. It should be noted that that although particular embodiments described herein use a core network director 120 embedded in the GGSN/PGW 108, in still other embodiments a core network director external to GGSN/PGW 108 may be connected to the GGSN/PGW 108 via a dedicated interface.

For some services it may be important that service state is recovered when a mobile node relocates (i.e., hands over) to another base station. In these cases, an out-of-band end-to-end session may be established between the core network client and the core network director on a per application/subscriber basis. Thus, when core network client 118a establishes the in-band GTP-U control channel as described above, core network director 120 may transmit a set of parameters to the core network client 118a that enables core network client 118a to establish an out-of-band control channel to core network director 120 for a specific subscriber and application. In case the mobile node reconnects to another base station, such as second base station 104b, core network director 120 may collect information from core network client 118a in first base station 104a and prime core network client 118b in second base station 104b with the recovered data.

Still referring to FIG. 4, in 416 first user equipment 102a experiences a handover procedure from being served by first base station 104a to being served by second base station 104b. In 418, second core network client 118b of second base station 104b sends a second request message to core network director 120 including the session identifier associated with the user session. In 420, core network director 120 sends a second response message to second core network client 118b. In 422, a second control channel is established between second core network client 118b and core network director 120. In a particular embodiment, the second control channel is an out-of-band control channel. In 424, core network director 120 retrieves the first state of the first core network client 118a including the policy information associated with the first state. In 426, core network director sends a second control message with the policy information of the first state to second core network client 118b. In 428, second core network client 118b implements the policy for the user session using the policy information associated with the first state of first core network client 118b. Subsequent user data associated with the user session will be processed by second core network client 118b using the one or more policies. Accordingly, first user equipment 102a can handoff from first base station 104a to second base station 104b while maintaining the policies associated with the user session.

In particular embodiments, state and services may be garbage collected explicitly or automatically to avoid uncontrolled state in core network clients 118a-118b. In 3GPP, a mobile node may become dormant or relocate to other base stations, and if core network client 118a is not informed of the departure of a mobile node e.g., by way of signaling received from the base station, state and services may need to be garbage collected in a timely fashion. In various embodiments, core network clients 118a-118b and core network director 120 may periodically exchange a keep-alive message, If a particular core network clients 118a-118b and core network director 120 have not received keep-alive messages for a predetermined amount of time, the state and the services associated with the GTP-U bearer are cleared.

In one or more embodiments, core network director 120 may request an orderly cleanup of the allocated resources per application/subscriber in the abandoned base station. In situations in which there is a failure or if the new base station does not include a core network client, the timeout mechanism described above may be used to clean up state. In addition, the core network director may unilaterally instruct the base station or other network element in the RAN to start and/or stop services in the RAN and/or base station using the core network client/core network director control protocol mechanisms described herein to signal the core network client of its request. In addition, in some embodiments application-specific services operating with the core network director may directly communicate with client-side application specific services through the same core network client/core network director protocol and exchange application-specific parameters. In a particular embodiment, core network clients 118a-118b and core network director 120 may be configured to operate even when they are only provided a partial packet stream for situations in which recovery of state is not always possible especially when a base station does not support the core network client/core network director protocol described herein.

In an alternative embodiment, an alternative manner of identifying which GGSN/PGW is associated with a particular bearer may be used in which the mobile device's IP address lies within an address pool associated with that particular GGSN/PGW for a given APN. Assuming that a single APN is used for the client/director protocol, the core network client may use a reverse domain name server (DNS) lookup to a suitably configured a server to obtain a GGSN/PGW name from the mobile device's IP address. This GGSN/P-GW name may then be used in a normal DNS lookup to provide an IP address of the GGSN/PGW for out-of-band communication with the core network director in the GGSN/PGW.

In various embodiments, the mechanism described for providing in-band control communication between the core network client and core network director may also be used by the core network client to send a copy of user data that is being exchanged between an application associated with the core network client and the mobile user to the core network director. This data could then be processed in the GGSN/PGW for, for example, charging or lawful interception purposes. To avoid possible address clashes and possibly simplify routing at the GGSN/PGW it may be necessary in some embodiments to encapsulate the user data packets in a simple IP-in-IP tunnel protocol, e.g. Generic Routing Encapsulation (GRE), and put the resulting IP packets in the GTP-U tunnel using the core network client and core network director IP addresses in an outer IP header. The core network control flow may also be sent out of the PGW via a dedicated interface in some embodiments.

Figure 5:
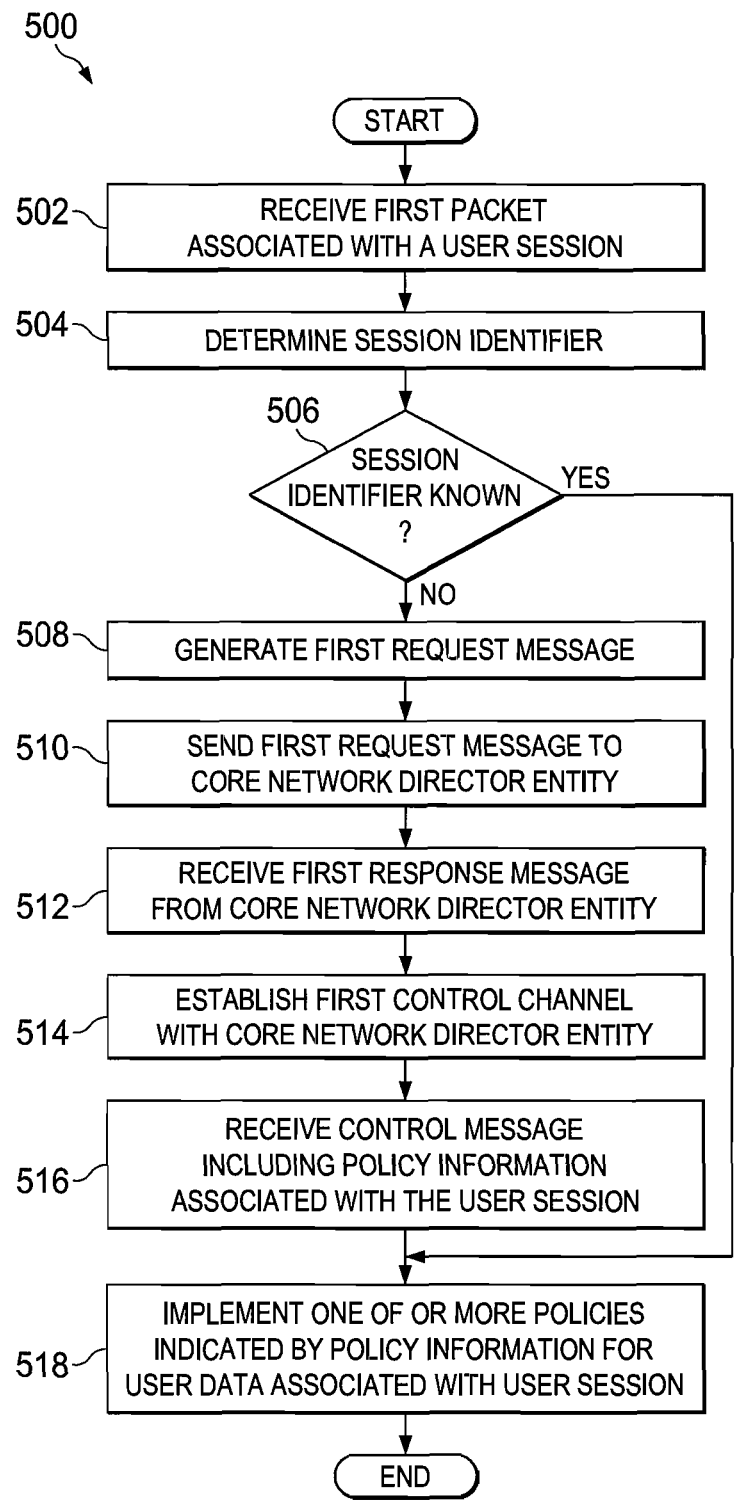
FIG. 5 is a simplified flow diagram illustrating potential operations associated with a core network client entity according to one embodiment of the present disclosure.

Referring now to FIG. 5, FIG. 5 is a simplified flow diagram 500 illustrating potential operations associated with a core network client entity according to one embodiment of the present disclosure. The core network client entity resides within or is associated with an access network such as a radio access network. In a particular embodiment, the core network client entity includes first core network client component 118a. In 502, the core network client entity receives a first packet associated with a user session. In a particular embodiment, the first packet is a mobile packet received from first user equipment 102a. In 504, the core network client entity determines a session identifier associated with the user session. In a particular embodiment, the session identifier includes one or more of a GTP tunnel identifier and next hop associated with the user session. In 506, the core network client entity determines whether the session identifier is known to the core network client entity. In one or more embodiments, the core network client entity determines whether the core session identifier is found in a table or list maintained by the core network client entity indicative of the core network client entity previously receiving the session identifier. If the core network client entity determines that the session identifier is not known to the core network client entity, the flow continues to 508. In 508, the core network client entity generates a first request message including the session identifier. In a particular embodiment, the session identifier may be a "nonce" or "number used once" as an arbitrary number used as an identifier of the session. In 510 the core network client entity sends the first request message to a core network director entity residing within or associated with a core network. In a particular embodiment, the core network director entity includes core network director component 120. Upon receiving the first request message, the core network director entity will generate and send a first response message to the core network client entity. In 512, the core network client entity receives the first response message from the core network director entity. In 514, the core network client entity establishes a first control channel with the core network director entity. In at least one embodiment, the first control channel is associated with the session identifier. The first control channel is associated with the user session. In at least one embodiment, the first control channel is an in-band channel established between the core network client entity and the core network director entity. In a particular embodiment, the first control channel is a channel implemented with a tunneling protocol such as a GTP-U tunneling protocol.

The core network director entity will generate policy information for the user session and send a control message including the policy information to the core network client entity using the first control channel. In 516, the core network client entity receives a first control message including the policy information using the first control channel. In 518, the core network client entity implements one or more policies indicated by the policy information for user data associated with the user session. If in 506 the core network client entity determines that the session identifier is known to the core network client entity, the operations continue to 518 as described above. In a particular embodiment, the session identifier being known to the core network client entity is indicative of the session identifier being previously received by the core network client entity. The operations then end.

Figure 6:
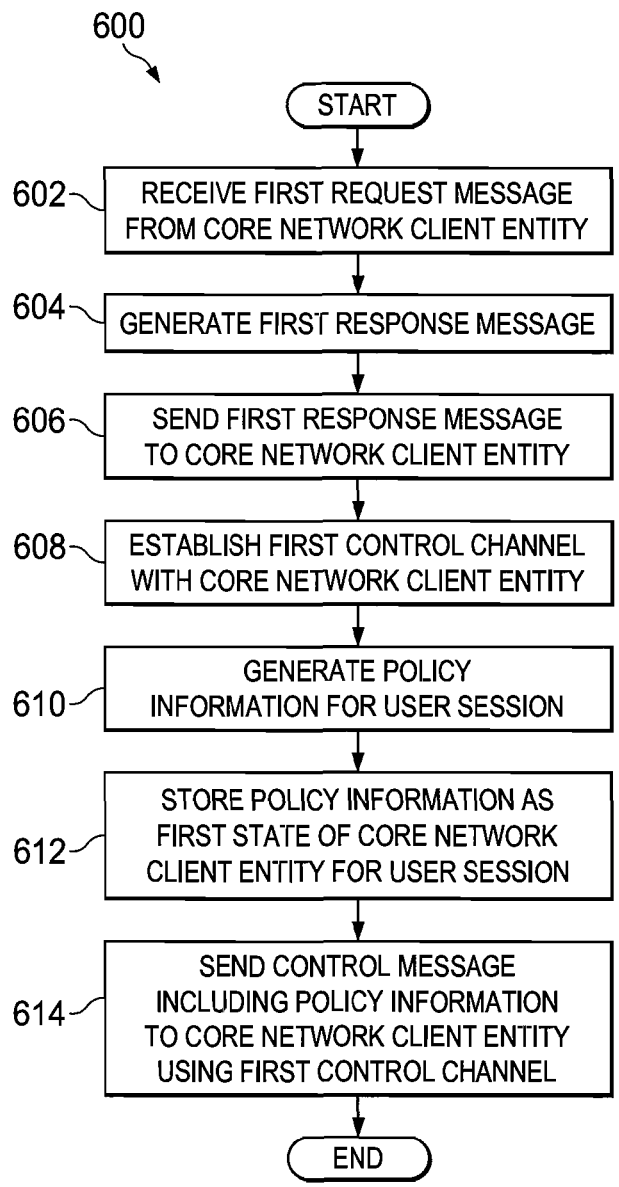
FIG. 6 is a simplified flow diagram illustrating potential operations associated with a core network director entity according to one embodiment of the present disclosure.

Referring now to FIG. 6, FIG. 6 is a simplified flow diagram 600 illustrating potential operations associated with a core network director entity according to one embodiment of the present disclosure. In a particular embodiment, the core network director entity includes core network director component 120. In 602, the core network director entity receives a first request message from a core network client entity. In a particular embodiment, the core network client entity includes first core network client component 118a. The first request message includes a session identifier associated with a user session. In a particular embodiment, the user session is associated with user equipment. In a particular embodiment, the session identifier includes a GTP tunnel identifier and next hop associated with the user session. In 604, the core network director entity generates a first response message. In one or more embodiments, the first response message includes subscriber information and connection information associated with the user session. In 606, the core network director entity sends the first response message to the core network client entity. In 608, the core network director entity establishes a first control channel with the core network client entity. In one embodiment, the first control channel is an in-band channel established between the core network client entity and the core network director entity. In a particular embodiment, the first control channel uses a GTP-U tunneling protocol. In still another embodiment, the first control channel may be an out-of-band channel established between the first core network client entity and the core network director entity.

In 610, the core network director entity generates policy information for the user session. In 612, the core network director entity stores the policy information as a first state of the core network client entity for the user session. The policy information indicates one or more policies to be applied to user data associated with the user session by the core network client entity. The policies may include one or more applications, services, or processing actions to be applied to user data associated with the user session. In 614, the core network director entity sends the first control messages with the policy information of the first state to the core network client entity using the first control channel. In response to receiving the policy information, the core network client entity may implement one or more policies identified and/or indicated by the policy information to the user session such that user data associated with the user session is processed according to the one or more policies. For example, implementing one or more policies may include executing an application within the RAN to process the user data. The operations then end.

Figure 7:
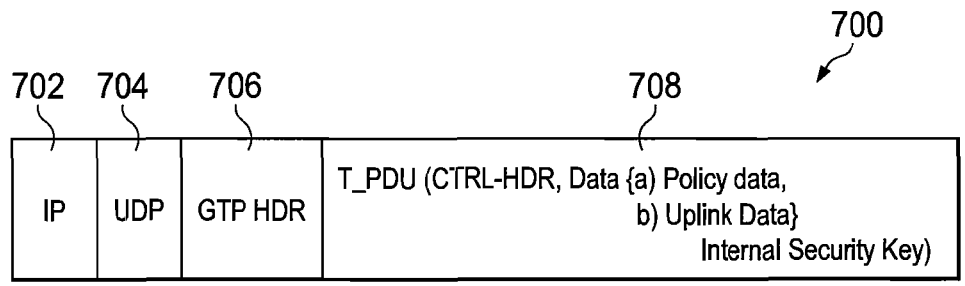
FIG. 7 is a simplified high level format of a communication packet for a control protocol according to an embodiment of the present disclosure.

FIG. 7 is a simplified high level format 700 of a communication packet for a control protocol according to an embodiment of the present disclosure. In a particular embodiment, a GTP tunneling protocol is extended to implement a control protocol between a RAN localized mobile data path and the mobile packet core network. In a particular embodiment, the control protocol is used to communicate between first core network client component 118a and core network director component 120. Various embodiments leverage the existing GTP protocol for implementing the control channel between mobile packet core and the RAN terminating entity. In the particular embodiment of FIG. 7, the control channel is implemented in-band per an existing GTP-U tunnel thus providing transparency in the existing networks with the same level of security while avoiding an additional overlay network. In traditional 3G and 4G macro cellular networks, a mobile user's data session is anchored on the mobile gateway (GGSN/PGW) working as part of the mobile packet core. Anchoring the mobile data session on the mobile gateway entails that both control and data traffic flows between the user and the gateway. A GTP-C protocol may be used to exchange control traffic between user equipment and the gateway while GTP-U protocol is used to send user data.

As previously discussed, a controlling entity in the mobile packet core embodied in core network client director 120 may be configured to send a set of policies during session setup as well as dynamically when required by the client entity in the RAN embodied by first core network client 118*a*. These policies may convey the actions for first core network client 118*a* to take for the user's data path and may include, for example, applying a set of local services, delivering local content and/or terminating the data path locally. The policies may be sent per user's data path using the control channel in an efficient and secure manner without disrupting normal network operations or topology.

n one or more embodiments, in order to selectively terminate a data path locally under the control of the mobile packet core requires that there is an effective and secure control channel between the core network director entity in the packet core and the core network client entity in the RAN. In a particular embodiment, the control channel may meet several requirements including that the policies are sent in real time either at the beginning of the session when the data path is established or while the data path is already active, the policies are sent per individual user data path so they map into a GTP tunnel that is established from the RAN to the gateway, and the policies are sent from the core network director entity in the mobile packet core that is collocated with the GTP terminating point on the gateway such that the core network director entity in the packet core is collocated with the user's point of attachment on the GGSN or PGW In some embodiments, it may be possible to send data from the core network client entity to the core network director entity and this data may need to reach the core network director entity first before being subject to by any other packet core functions, the control channel should not be disruptive to the existing network deployment and topology so that it does not require configuring additions logical termination points so that there is no need for additional IP addresses, and the control channel should be secure and it should not be possible that the control channel is used for other messages then the ones defined on core network client entity and the core network director entity.

Various embodiments provide that the control channel between the core network director entity in the packet core network and the core network client entity in the RAN leverages an existing GTP-U protocol as well as a GTP tunnel that is established between the UE/RAN and the point of attachment in the gateway (GGSN/PDN GW). In one or more embodiments, the core network client entity and the core network director entity know both uplink and downlink TEIDs of the GTP tunnel and therefore the packets exchanged between the core network client entity and the core network director entity will be part of GTP-U and they will use the existing TEIDs for the given session. This allows the core network client entity and the core network director entity to receive these packets without the need to become new network entities. Re-using existing TEIDs enables the packet to be immediately associated with the correct session. The client-director control packets may have a special marking of Core Network ID (CN-ID) to distinguish them from the regular GTP-U packets. In other embodiments, client-director control packets may be tagged with a special IP address.

Referring to FIG. 7, the simplified high level format 700 includes an IP field 702, a UDP field 704, a GTP HDR field 706, and a T_PDU data portion 708. IP field 702 indicates that the packet is an Internet Protocol (IP) packet. UDP field 704 indicates that the packet includes a User Datagram Protocol (UDP). GTP HDR field 706 is a standard GTP-U header as described in 3GPP TS 29.281. GTP HDR field 706 indicates that this is a special client-director control packet. A standard GTP mechanism such as Extension Header may be used for this purpose. The T-PDU data portion 708 includes the data portion of the GTP-U packet. For the client-director control protocol described herein, the format of the T-PDU data portion 708 is as follows: a CTRL-HDR field that indicates the type of control data that follows and a Data field that contains either Policy data or Uplink Data. Policy data is data sent from the core network director entity to the core network client entity in the downlink direction. The policy data specifies a set of policies that instruct the core network client entity how to handle flows for the particular session. The policies can be specified for the whole flow or 5-tuple filters may be used. In some embodiments, the Policy data can either piggy-back on the existing downlink GTP-U packet or a new GTP-U packet can be created by the core network director entity to send to the core network client entity based upon dynamically changed network conditions. In still other embodiments, the Policy data may be sent through an established control channel. Uplink data is the data sent from the core network client entity to the core network director entity in the uplink direction. The uplink data is destined for the core network director entity first before it is subject to processing by any other gateway functions. The uplink data may be sent spontaneously from the core network client entity to the core network director entity in the uplink direction. The T-PDU data portion 708 may further include an Internal Security Key that is used between the core network client entity and core network director to protect communication therebetween as very sensitive messages may be exchanged between the core network client entity and the core network director entity which could violate the core network.

These GTP-U packets may be originated either by the core network client entity in the RAN or the core network director entity in the packet core. The uplink packets may be specifically created when the core network client entity needs to send Uplink Data. The downlink packets can either be specifically created for the sole purpose of sending the downlink policies or can piggy-back on the downlink data.

Figure 8:
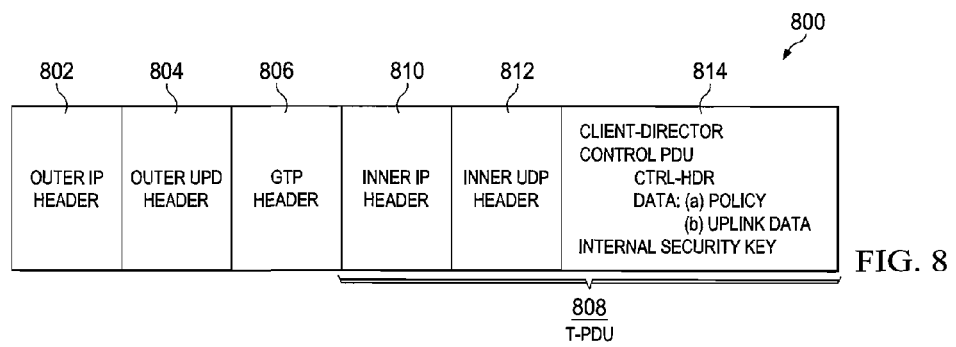
FIG. 8 is an alternative simplified high level format of a communication packet for a control protocol according to an embodiment of the present disclosure

FIG. 8 is an alternative simplified high level format 800 of a communication packet for a control protocol according to an embodiment of the present disclosure. High level format 800 includes an Outer IP field 802, an Outer UDP header field 804, a GTP HDR 806, and a T-PDU data portion 808. Outer IP field 802 may include an IP address of a base station such as an eNodeB or an IP address of the PGW. Outer UDP header field 804 may include a port number for the GTP-U. The T-PDU data portion 808 includes an Inner IP field 810, an Inner UDP field 812 and a Client-Director Control PDU 814. Inner IP header field 810 may include a source-uplink/destination-downlink IP address that is different from the mobile device's IP address. Inner UDP header field 812 may include a port number not normally used in user data packets. The IP addresses and UDP port numbers used for the T-PDU 908 may be chosen to be distinguishable from those to be found in user data packets. For the client-director control protocol described herein, the format of the control-PDU 814 field is as follows: a CTRL-HDR field that indicates the type of control data that follows and a Data field that contains either Policy data or Uplink Data. The client-director control PDU 914 may further include an Internal Security Key that is used between the core network client entity and core network director to protect communication therebetween.

Various embodiments described herein provide for implementing a client-director control channel by leveraging an in-band GTP-U message and allowing the policies to be sent in real time in an efficient and secure manner. By re-using TEIDs of the existing GTP tunnel the packets get mapped correctly into the right data session thus eliminating the need for new identifiers. The communication is bi-directional thus allowing both client and director to send data. In addition, these procedures are not disruptive to the existing core network topology as it does not require that the client and director appear as new logical nodes in the network architecture thus avoiding the overhead of introduction of new logical nodes such as mutual discovery mechanisms, authentication mechanisms, and new IP addresses.

It should be noted that in some embodiments, the client-director control channel could be implemented as out-of-band (over the top) protocol. In such embodiments, all clients and the director appear as new, addressable logical entities in the mobile network such that new IP addresses, configuration and management may be required.

Note that in certain example implementations, the data communication and routing functions outlined herein may be implemented by logic encoded in one or more tangible media (e.g., embedded logic provided in an application specific integrated circuit [ASIC], network processors, digital signal processor [DSP] instructions, software [potentially inclusive of object code and source code] to be executed by a processor, or other similar machine, etc.). In some of these instances, a memory element (as shown in FIG. 2 and FIG. 3) can store data used for the operations described herein. This includes the memory element being able to store software, logic, code, or processor instructions that are executed to carry out the activities described in this Specification.

A processor can execute any type of instructions associated with the data to achieve the operations detailed herein in this Specification. In one example, the processor (as shown in FIG. 2 and FIG. 3) could transform an element or an article (e.g., data) from one state or thing to another state or thing. In another example, the data communication and routing activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable ROM (EEPROM)) or an ASIC that includes digital logic, software, code, electronic instructions, or any suitable combination thereof.

In one example implementation, base stations 104a-104b and GGSN/PGW 108 may include software in order to achieve the data communication functions outlined herein. These devices may further keep information in any suitable memory element (random access memory (RAM), ROM, EPROM, EEPROM, ASIC, etc.), software, hardware, or in any other suitable component, device, element, or object where appropriate and based on particular needs. Any of the memory items discussed herein (e.g., database, tables, trees, queues, caches, etc.) should be construed as being encompassed within the broad term 'memory element.' Similarly, any of the potential processing elements, modules, and machines described in this Specification should be construed as being encompassed within the broad term 'processor.' Each of these elements can also include suitable interfaces for receiving, transmitting, and/or otherwise communicating data or information in a network environment.

Base stations 104a-104b and GGSN/PGW 108 are network elements configured to perform the activities disclosed herein. As used herein in this Specification, the term 'network element' may include any suitable hardware, software, components, modules, interfaces, or objects operable to exchange information in a network environment. Further, the term network element as discussed herein encompasses (but is not limited to) devices such as routers, switches, gateways, bridges, loadbalancers, firewalls, inline service nodes, proxies, clients, servers processors, modules, or any other suitable device, component, element, proprietary device, network appliance, or object operable to exchange information in a network environment. This may be inclusive of appropriate algorithms and communication protocols that allow for the effective exchange of data or information.

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 100 (and its teachings) are readily scalable and can accommodate a large number of components, as well as more complicated/sophisticated arrangements and configurations. Accordingly, the examples provided should not limit the scope or inhibit the broad teachings of communication system 100 as potentially applied to a myriad of other architectures.

It is also important to note that the steps in the preceding flow diagrams illustrate only some of the possible scenarios and patterns that may be executed by, or within, communication system 100. Some of these steps may be deleted or removed where appropriate, or these steps may be modified or changed considerably without departing from the scope of the present disclosure. In addition, a number of these operations may have been described as being executed concurrently with, or in parallel to, one or more additional operations. However, the timing of these operations may be altered considerably. The preceding operational flows have been offered for purposes of example and discussion. Substantial flexibility is provided by communication system 100 in that any suitable arrangements, chronologies, configurations, and timing mechanisms may be provided without departing from the teachings of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. It is also imperative to note that the architecture outlined herein can be used in different types of network applications. The architecture of the present disclosure can readily be used such environments, as the teachings of the present disclosure are equally applicable to all such alternatives and permutations.

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
    sending, by a first entity associated with an access network, a first request message including a session identifier associated with a user session to a second entity associated with a core network;
    establishing a control channel with the second entity, the control channel associated with the session identifier; and
    receiving policy information associated with the user session from the second entity using the control channel, the policy information indicative of one or more policies to be applied in the access network to user data associated with the user session, wherein the policy information is included within a tunneling protocol packet.

2. The method of claim 1, further comprising implementing the one or more policies indicated by the policy information for user data associated with the user session.

3. The method of claim 2, wherein implementing the one or more policies includes executing an application within the access network to process the user data in accordance with the one or more policies.

4. The method of claim 1, wherein the policy information is included within a data portion of the tunneling protocol packet.

5. The method of claim 1, wherein the tunneling protocol packet is a GPRS Tunneling Protocol user data (GTP-U) packet.

6. The method of claim 1, wherein the first entity is a client entity and the second entity is a director entity.

7. The method of claim 1, wherein the user session is associated with a user equipment.

8. The method of claim 1, wherein the first entity resides within a base station.

9. The method of claim 1, wherein the second entity resides within a packet gateway.

10. One or more non-transitory tangible media that includes code for execution and when executed by a processor configured to perform operations comprising:
    sending, by a first entity associated with an access network, a first request message including a session identifier associated with a user session to a second entity associated with a core network;
    establishing a control channel with the second entity, the control channel associated with the session identifier; and
    receiving policy information associated with the user session from the second entity using the control channel, the policy information indicative of one or more policies to be applied in the access network to user data associated with the user session, wherein the policy information is included within a tunneling protocol packet.

11. The media of claim 10, wherein the operations further include implementing the one or more policies indicated by the policy information for user data associated with the user session.

12. The media of claim 11, wherein implementing the one or more policies includes executing an application within the access network to process the user data in accordance with the one or more policies.

13. The media of claim 10, wherein the policy information is included within a data portion of the tunneling protocol packet.

14. The media of claim 10, wherein the first entity resides within a base station.

15. The media of claim 10, wherein the second entity resides within a packet gateway.

16. An apparatus, comprising:
    a memory element configured to store data,
    a processor configured to execute instructions associated with the data, and
    at least one module being configured to:
        send, by a first entity associated with an access network, a first request message including a session identifier associated with a user session to a second entity associated with a core network;
        establish a control channel with the second entity, the control channel associated with the session identifier; and
        receive policy information associated with the user session from the second entity using the control channel, the policy information indicative of one or more policies to be applied in the access network to user data associated with the user session, wherein the policy information is included within a tunneling protocol packet.

17. The apparatus of claim 16, wherein the at least one module is further configured to implement the one or more policies indicated by the policy information for user data associated with the user session.

18. The apparatus of claim 17, wherein implementing the one or more policies includes executing an application within the access network to process the user data in accordance with the one or more policies.

19. The apparatus of claim 16, wherein the policy information is included within a data portion of the tunneling protocol packet.

20. The apparatus of claim 16, wherein the first entity resides within a base station.

21. The apparatus of claim 16, wherein the second entity resides within a packet gateway.

* * * * *